(12) United States Patent
Malks et al.

(10) Patent No.: US 9,367,595 B1
(45) Date of Patent: Jun. 14, 2016

(54) METHOD AND SYSTEM FOR VISUAL WIRING TOOL TO INTERCONNECT APPS

(75) Inventors: Daniel Malks, Arlington, VA (US); Karthic Thope, Fairfax, VA (US)

(73) Assignee: Software AG USA Inc., Reston, VA (US)

( * ) Notice: Subject to any disclaimer, the term of this patent is extended or adjusted under 35 U.S.C. 154(b) by 1380 days.

(21) Appl. No.: 13/152,388

(22) Filed: Jun. 3, 2011

Related U.S. Application Data

(60) Provisional application No. 61/351,367, filed on Jun. 4, 2010.

(51) Int. Cl.
G06F 3/048 (2013.01)
G06F 17/30 (2006.01)

(52) U.S. Cl.
CPC .... *G06F 17/30569* (2013.01); *G06F 17/30867* (2013.01); *Y10S 707/99943* (2013.01)

(58) Field of Classification Search
CPC ... H04L 67/02; H04W 4/18; G06F 17/30569; G06F 17/30867; Y10S 707/99943
USPC ................................................ 715/967, 969
See application file for complete search history.

(56) References Cited

U.S. PATENT DOCUMENTS

| | | | |
|---|---|---|---|
| 4,914,586 A | 4/1990 | Swinehart et al. | |
| 6,119,135 A | 9/2000 | Helfman | |
| 6,674,447 B1 | 1/2004 | Chiang et al. | |
| 6,684,207 B1 | 1/2004 | Greenfield et al. | |
| 6,760,306 B1 | 7/2004 | Pan et al. | |
| 6,880,016 B1 * | 4/2005 | Van Der Heijden et al. | 709/230 |
| 6,886,044 B1 * | 4/2005 | Miles et al. | 709/238 |
| 7,103,680 B1 * | 9/2006 | Holdsworth | G06F 17/30569 707/999.01 |
| 7,149,982 B1 | 12/2006 | Duperrouzel et al. | |
| 7,237,207 B2 * | 6/2007 | Panditharadhya et al. | 715/805 |
| 7,284,233 B2 * | 10/2007 | Sengodan | 717/102 |
| 7,529,794 B2 * | 5/2009 | Dorai | H04L 12/5855 709/204 |
| 7,536,413 B1 | 5/2009 | Mohan et al. | |
| 7,548,542 B2 * | 6/2009 | Lepel et al. | 370/392 |
| 7,788,251 B2 | 8/2010 | Carlson et al. | |

(Continued)

OTHER PUBLICATIONS

"user interface", IEEE 100, The Authoritative Dictionary of IEEE Standards Terms, 7th edition, copyright 2000 by The Institute of Electrical and Electronics Engineers. ISBN 0-7381-2601-2. p. 1242.*

(Continued)

*Primary Examiner* — Doon Chow
*Assistant Examiner* — Wilson Varga
(74) *Attorney, Agent, or Firm* — Posz Law Group, PLC

(57) ABSTRACT

A computer system includes a display interface; a user input device interface; and a processor cooperatively operable with the display and user input device interfaces. The processor provides a browser user interface that interacts with a user to selectively indicate (i) content fields displayed in the source user interface from which information is to be sent and (ii) content fields displayed in the destination user interface which are to receive the information from the source content fields. The computer system stores an indication of the destination app registered for the topic together with an indication of the selected destination content fields which are to receive the information from the selected content fields of the source app. The source app and destination app do not publish/subscribe to each other. An intermediary brokers messages from the source app, maps the data, and sends on to the destination app.

14 Claims, 9 Drawing Sheets

(56) References Cited

U.S. PATENT DOCUMENTS

| | | | |
|---|---|---|---|
| 7,831,559 B1 | 11/2010 | Mohan et al. | |
| 7,840,610 B2* | 11/2010 | Chandrasekharan | G06F 17/30569 707/809 |
| 7,853,553 B2* | 12/2010 | Lankinen et al. | 707/602 |
| 7,904,818 B2 | 3/2011 | Lauridsen et al. | |
| 8,321,792 B1 | 11/2012 | Alur et al. | |
| 8,397,056 B1 | 3/2013 | Malks et al. | |
| 8,584,082 B2* | 11/2013 | Baird et al. | 717/105 |
| 8,683,359 B2* | 3/2014 | Jugel | 715/762 |
| 2001/0028368 A1 | 10/2001 | Swartz et al. | |
| 2002/0178119 A1 | 11/2002 | Griffin et al. | |
| 2002/0186260 A1* | 12/2002 | Young | G06F 21/604 715/853 |
| 2003/0117437 A1 | 6/2003 | Cook et al. | |
| 2003/0120665 A1* | 6/2003 | Fox | G06F 17/30557 |
| 2003/0197726 A1 | 10/2003 | Weitzman | |
| 2004/0003097 A1* | 1/2004 | Willis | G06F 17/30873 709/228 |
| 2004/0183831 A1 | 9/2004 | Ritchy et al. | |
| 2004/0207659 A1 | 10/2004 | Goodman et al. | |
| 2004/0221296 A1 | 11/2004 | Ogielski et al. | |
| 2005/0166180 A1* | 7/2005 | Lemon et al. | 717/106 |
| 2005/0278323 A1 | 12/2005 | Horvitz et al. | |
| 2006/0080596 A1* | 4/2006 | Bhogal et al. | 715/503 |
| 2006/0155578 A1* | 7/2006 | Eisenberger | G06F 19/322 705/2 |
| 2006/0156314 A1* | 7/2006 | Waldorf | 719/328 |
| 2007/0058629 A1* | 3/2007 | Luft | 370/390 |
| 2007/0067722 A1 | 3/2007 | Ames et al. | |
| 2007/0112955 A1 | 5/2007 | Clemm et al. | |
| 2007/0130541 A1* | 6/2007 | Louch et al. | 715/804 |
| 2007/0157096 A1* | 7/2007 | Keren et al. | 715/760 |
| 2007/0162850 A1 | 7/2007 | Adler et al. | |
| 2007/0162936 A1 | 7/2007 | Stallings et al. | |
| 2007/0240063 A1 | 10/2007 | Cheng et al. | |
| 2007/0282673 A1 | 12/2007 | Nagpal et al. | |
| 2008/0016232 A1 | 1/2008 | Yared et al. | |
| 2008/0034314 A1* | 2/2008 | Louch et al. | 715/778 |
| 2008/0155440 A1* | 6/2008 | Trevor | G06Q 30/02 715/769 |
| 2008/0215675 A1 | 9/2008 | Kaminitz et al. | |
| 2008/0270929 A1 | 10/2008 | Bohn et al. | |
| 2009/0205029 A1 | 8/2009 | Noda et al. | |
| 2009/0228563 A1* | 9/2009 | Jones | G06F 9/526 709/206 |
| 2009/0254745 A1* | 10/2009 | Ganesan | 713/151 |
| 2009/0265362 A1 | 10/2009 | Parsons et al. | |
| 2009/0313601 A1* | 12/2009 | Baird et al. | 717/106 |
| 2009/0328205 A1 | 12/2009 | Ims et al. | |
| 2010/0034258 A1 | 2/2010 | Pandit et al. | |
| 2010/0037157 A1* | 2/2010 | Chang | G06F 8/36 715/764 |
| 2010/0042973 A1 | 2/2010 | Anderson et al. | |
| 2010/0070925 A1 | 3/2010 | Einaudi et al. | |
| 2010/0082989 A1 | 4/2010 | Bussard et al. | |
| 2010/0131869 A1* | 5/2010 | Adachi et al. | 715/760 |
| 2010/0153865 A1* | 6/2010 | Barnes | G06F 9/4443 715/762 |
| 2010/0192140 A1* | 7/2010 | Kamiyama | G06F 3/0482 717/167 |
| 2010/0211580 A1* | 8/2010 | Sreekanth | G06F 8/10 707/756 |
| 2010/0256994 A1* | 10/2010 | Eisenberger | G06Q 10/10 705/3 |
| 2010/0257242 A1* | 10/2010 | Morris | 709/206 |
| 2010/0269149 A1 | 10/2010 | Lee et al. | |
| 2010/0293461 A1* | 11/2010 | Boezeman et al. | 715/708 |
| 2010/0318619 A1* | 12/2010 | Meijer | G06Q 10/10 709/206 |
| 2012/0030592 A1* | 2/2012 | Cui et al. | 715/763 |
| 2012/0096429 A1* | 4/2012 | Desai | G06F 8/34 717/107 |
| 2012/0110073 A1* | 5/2012 | Chakra et al. | 709/204 |

OTHER PUBLICATIONS ebiz, "JackBe Announces Free Enterprise Mashup Developer Software", Oct. 27, 2008, retrieved from the internet http://www.ebizq.net/news/10503.html on Jun. 12, 2014; 2 pages.*

Jackbe, "A Business Guide to Enterprise Mashups", Apr. 2008, retrieved from the internet http://mdc.jackbe.com/downloads/JackBe_business_guide_to_enterprise_mashups.pdf on Jun. 12, 2014; 14 pages.*

"OpenAjax Hub 2.0 Specification Publish Subscribe Overview", OpenAjax Hub 2.0 Specification, Jul. 23, 2009, retrieved from the internet at . http://www.openajax.org/member/wiki/OpenAjax_Hub_2.0_Specification_Publish_Subscribe_Overview on Dec. 16, 2014, 9 pgs.*

"OpenAjax Hub 2.0 Specification Managed Hub Overview", OpenAjax Hub 2.0 Specification, Jul. 23, 2009, retrieved from the internet at http://www.openajax.org/member/wiki/OpenAjax_Hub_2.0_Specification_Managed_Hub_Overview on Dec. 16, 2014, 13 pgs.*

"OpenAjax Hub 2.0 Specification Topic Names", OpenAjax Hub 2.0 Specification, Jul. 23, 2009, retrieved from the internet at http://www.openajax.org/member/wiki/OpenAjax_Hub_2.0_Specification_Topic_Names on Dec. 16, 2014, 5 pgs.*

"map," "mapping," "message," "property," "publication key," "publication topic," publish-subscribe communicaton, "register," "subscription qualifier" definitions: IEEE 100, The Authoritative Dictionary of IEEE Standards Terms, 7th edition, copyright 2000 by The Institute of Electrical and Electronics Engineers. ISBN 0/7381-2601-2. pp. 664-665.*

Indicate, Indication; 2011, American Heritage Dictionary of the English language; Houghton Mifflin. Retrieved from http://search.credoreference.com/content/entry/hmdictenglang/indicate/0 . . . /indication/0 on Oct. 12, 2015; 4 pgs.*

Office Action issued by the U.S. Patent Office on Jun. 8, 2012 in connection with related U.S. Appl. No. 12/763,582.

Office Action issued by the U.S. Patent Office on Aug. 8, 2012 in connection with related U.S. Appl. No. 12/763,517.

Notice of Allowance issued by the U.S. Patent Office on Aug. 8, 2012 in connection with related U.S. Appl. No. 12/763,798.

Office Action issued by the U.S. Patent Office on Sep. 11, 2012 in connection with related U.S. Appl. No. 12/890,224.

U.S. Appl. No. 13/759,632, filed Feb. 5, 2013, Malks et al.

Magazinius et al., "A Lattice-based Approach to Mashup Security", Apr. 2012, pp. 15-23.

Final Office Action issued by the U.S. Patent Office on Dec. 18, 2012 in connection with related U.S. Appl. No. 12/763,517.

Notice of Allowance issued by the U.S. Patent Office on Dec. 26, 2012 in connection with related U.S. Appl. No. 12/763,582.

Notice of Allowance issued by the U.S. Patent Office on Mar. 6, 2013 in connection with related U.S. Appl. No. 12/763,517.

Office Action issued by the U.S. Patent Office on Dec. 22, 2011 in connection with related U.S. Appl. No. 12/763,798.

Office Action mailed by the U.S. Patent Office on Dec. 30, 2011 in connection with related U.S. Appl. No. 12,763,724.

Office Action issued by the U.S. Patent Office on Jan. 9, 2012 in connection with related U.S. Appl. No. 12/763,517.

* cited by examiner

METHOD AND SYSTEM FOR VISUAL WIRING TOOL TO INTERCONNECT APPS

CROSS-REFERENCE TO RELATED APPLICATIONS

This application claims the benefit of the following Provisional application: 61/351,367 filed Jun. 4, 2010, which is expressly incorporated herein by reference.

TECHNICAL FIELD

The technical field relates in general to computer networks, and more specifically to apps and sharing data in apps.

BACKGROUND

Conventionally, a developer must write custom code to send information from one app to another. A less technically savvy user cannot interconnect apps.

For example, OpenAjax Hub 2.0 provides publish/subscribe services that enable script logic (from libraries, components and the application itself) to publish events on a broadcast basis and to listen (i.e., subscribe) to events fired by other script logic. However, this requires the ability to code the script logic into the publisher/subscriber apps.

SUMMARY

Accordingly, one or more embodiments provides a computer system, a computer-readable non-transitory medium, and/or a method. The embodiments can provide for a client computer system comprising a display interface; a user input device interface; and a processor. The processor is cooperatively operable with the display interface and the user input device interface, and configured to facilitate providing a browser user interface that simultaneously displays on a single page via the display interface, a destination user interface of a destination app, a source user interface of the source app, and a topic; interacts with a user, via the user input device interface, to selectively indicate on the browser user interface (i) content fields displayed in the source user interface from which information is to be sent and (ii) content fields displayed in the destination user interface which are to receive the information from the content fields in the source user interface. The processor also stores, in a container storage, an indication of the destination app as being registered for the topic together with an indication of the selected content fields of the destination app which are to receive the information from the selected content fields of the source app, whereby the source app and the destination app do not need to be known to each other and are wired together at the container storage.

The embodiment can include running the destination app via the display interface; and receiving a message from an intermediary processor instead of from the source app, the message having destination information input to the destination app, so that publication caused by a change to the information at the source app triggers a reaction in the destination user interface displaying the information at the destination app.

Another embodiment provides a browser user interface that simultaneously displays on a single page a plurality of topics which are published each having a source app, and interacts with a user to select at least one destination app to register for at least one of the plurality of topics.

Another embodiment provides a browser user interface that simultaneously displays on a single page a plurality of topics which are published each having a source app and at least one registered destination app, and interacts with a user to select one or more of the topics to be disabled from publishing.

According to another embodiment there is provided an intermediary computer system, comprising a container storage; and an intermediary processor cooperatively operable with the container storage. The processor is configured to facilitate: providing, in the container storage, an indication of a topic, an indication of a source app that publishes information regarding the topic, an indication of a destination app registered for the topic to receive the information, and a property mapping indication of how the information to be sent from the source app maps to destination information displayed at a destination user interface of the destination app; receiving, at the intermediary processor instead of at the destination app, a published message from the source app, the published message including the information sent from the source app and not property-mapped according to the property mapping in the container storage; and obtaining, at the intermediary processor from the container storage, the indication of the destination app registered for the topic, and then sending from the intermediary processor to the destination app registered for the topic the published message with the information which has been property-mapped as destination information according to the property mapping in the container storage, when the published message includes the topic with the registered destination app stored on the container storage, so that publication caused by a change to the information at the source app triggers a reaction in the destination user interface displaying the information at the destination app.

Another embodiment includes mapping, at the intermediary processor, the information in the published message received from the source app according to the property mapping in the container storage and sending to the destination app a destination message with the information which has been property-mapped as destination information. The mapping can omit a portion of the information, recast at least a portion of the information to a different data-type, extract of at least a portion of the information, perform a calculation on the information, perform a string manipulation on the information, augment the information, so as to conform information that is not compatible as-is from the source app to the content fields displayed at the destination user interface which are to receive the information.

According to another embodiment, receipt of the message at the intermediary processor and publication of the message from the intermediary processor is performed in accordance with OpenAjax Hub standards.

In another embodiment, there is provided an intermediary computer system acting as a server, and a client computer system that is running the registered destination app as a client and further that is cooperatively connected to and in communication with the server. The intermediary processor coordinates receipt by the client of messages published from the source app having information for the topic listing the registered destination app stored on the container storage.

There can also be a computer-implemented method, implemented on a computer system, for visual wiring of apps. The method can include providing, in a container storage, an indication of a topic, an indication of a source app that publishes information regarding the topic, an indication of a destination app registered for the topic to receive the information, and a property mapping indication of how the information to be sent from the source app maps to destination information displayed at a destination user interface of the destination app; receiving, at an intermediary processor instead of at the destination app, a published message from the source app, the published message including the information sent from the source app and not property-mapped according to the property mapping in the container storage; and obtaining, at the intermediary processor from the container storage, the indication of the destination app registered for the topic, and then sending from the intermediary processor to the destination app registered for the topic the published message with the information which has been property-mapped as destination information according to the property mapping in the container storage, when the published message includes the topic with the registered destination app stored on the container storage, so that publication caused by a change to the information at the source app triggers a reaction in the destination user interface displaying the information at the destination app.

Still another embodiment provides for a non-transitory computer-readable medium storing computer-executable instructions that provide the method when executed.

Still other embodiments provide for a method for the foregoing, and/or a non-transitory computer-readable medium with instructions thereon which, when executed, perform the foregoing.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles.

DETAILED DESCRIPTION

Figure 1:
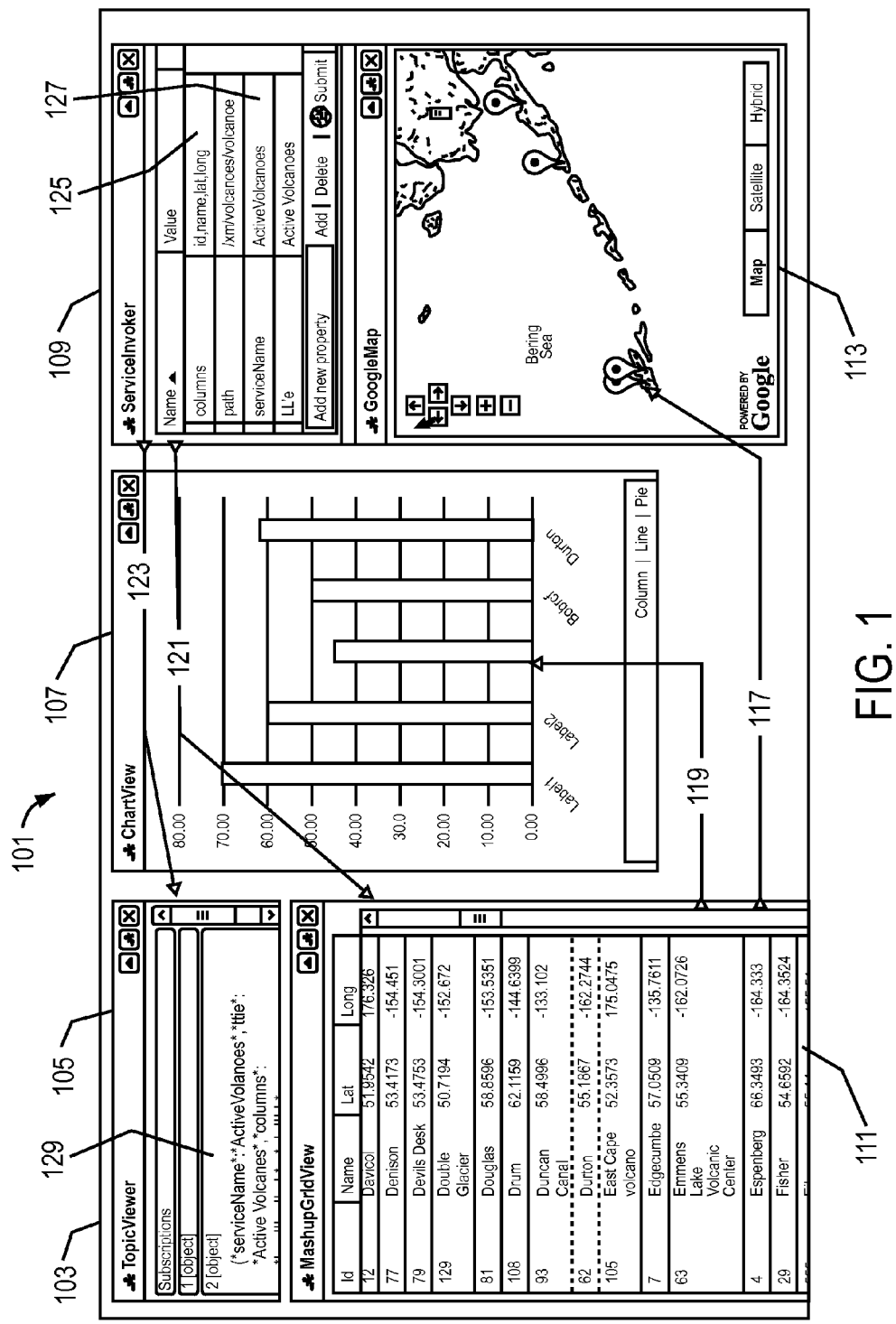
FIG. 1 is an example user interface.

In overview, the present disclosure concerns computer systems, sometimes referred to as client/server networks, such as may be associated with computer systems providing apps. Such computer systems often involve running an app on a user's computer that invokes a web service providing live data. More particularly, various inventive concepts and principles are embodied in systems, devices, and methods therein for interconnecting apps and especially for communicating data from one app to another.

The computer systems of particular interest are those providing or facilitating apps over communication networks involving a data server and a user's computer, and the like, and variants or evolutions thereof.

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts herein, further discussion of such software and ICs, if any, will be limited to the essentials with respect to the principles and concepts used by the exemplary embodiments.

As further discussed herein below various inventive principles and combinations thereof are advantageously employed to facilitate a means for an app to receive published data without re-programming the app to insert hand-shaking about the topics that may be published and how to react to different topics. Apps conventionally publish topics. However, conventionally there has been no easy way for an ordinary user to wire the data from an app to be requested by and received specifically by another app. The following disclosure provides various principles that disclose how to broker the published information so it can be used by a pre-existing app without programming the app to specifically receive topics from the source app that provides the information. Setting up the intermediary broker via a simple user interface provides a visual wiring metaphor which is easy for an ordinary user to manipulate.

Overview

Referring now to FIG. 1, an example user interface 101 will be discussed and described. The event wiring capability allows for interconnecting one or more apps 105, 107, 109, 111, 113 to orchestrate functional and behavioral dependency between apps and build an event-driven interconnected app 113. When one or more apps are wired, initiating an action on one app (source) can trigger reactions from the connected apps (target). The target apps in turn could initiate other events in response which could lead to additional changes. Event wiring can be persisted within an applicable app container to permanently store the dependencies.

Here, there is a single screen 103 on which are displayed apps 105, 107, 109, 111, 113, for example on a dashboard, and each of the apps is focused on different information. (An app can be thought of as a way to visualize a mashup.) A topic viewer app 105 lists topics 129 to which a destination app can subscribe. Destination apps which receive information (typically from a data service or as specified by interaction with a user) in this example include MashupGridView 111 which populates a grid with data, the number of rows and columns matching the amount of incoming information; a ChartView app 107 provides a bar chart with a labels on the x-axis, and quantities on the y-axis; and a GoogleMap app 113 provides a map with pushpins indicating latitude/longitude of various geographic locations. A ServiceInvoker app 109 lists available source apps that publish information as data services, in this example, an app 127 that provides data on "active volcanoes" and listing the data from the service 125: "id, name, lat, long".

As later described, the user can interact with the user interface 101 (sometimes referred to as a "source-destination-browser user interface") (e.g., via the ServiceInvoker 109) to indicate that one of the source apps should publish data specifically to one or more of the destination apps 107, 111, 113. Then, the destination apps receive the information and display the information. Since the Active Volcanoes 127 source app publishes information on ID, name, lat and long, the MashupGridView destination app 111 does what it usually does and populates the information into a grid, resulting in a list of volcanoes, more particularly, the information is provided, in the illustrated columns, as ID, name, lat (latitude) and long (longitude). However, the published information is more than can be used by ChartView and GoogleMap. Here, the ChartView app 107 is a destination app and receives 119 "Name" and "lat" information only and accordingly displays only that information as "label" and quantity. Here, the GoogleMap app 113 is a destination app and receives 117 only "long" and "lat" and displays pushpins 115 at the input longitude and latitude.

In this example, the app ServiceInvoker 109 is sending a message 123 to the app TopicViewer 105. Also, the user can select MashupGridView 111 as a receiver to receive a message 121 from ServiceInvoker 109 as the sender.

Then, the user can map the parameters that come in from the message from the sender to what the receiver's parameters are.

Then, when the user clicks the "Submit" button on ServiceInvoker app 109, the TopicViewer 105 is updated (due to the change of data in the source app 109) and the MashupGridView destination app 111 displays are updated. ServiceInvoker 109 is a source app that is wired as a sender to destination apps 105, 111 TopicViewer and also to MashupGridView which are receivers.

Then, for example, the user can click the wiring button, to wire ServiceInvoker 109 as a source app to a different destination app, that is, ChartView 107. Then, the user can map the ServiceInvoker and ChartView parameters, and click the "Finish" button. The destination app behaves as usual upon receiving the information from the source app. Consequently, the user can create the wiring between the source and destination app via the user interface, without adding further instructions to the destination app to specifically receive information from the source app.

As another example, a user can wire the GoogleMap app 113 as a destination app to receive a message from the ActiveVolcanoes app, as follows. The user can select a row in MashupGridView 111. The system can be wired to use the ID and the label (parameters in the selected row) in MashupGridView to set an item in the ChartView app 107. The system can be wired to use the latitude and longitude (parameters in the selected row) to set a pushpin on the GoogleMap app 113.

App Event Wiring Tool

App event wiring can be performed using a visual wiring tool that allows users to browse and inspect the available event topics and connect one or more of them to suitable a target app, simply through the visual interface. Apps can publish multiple events and multiple apps can be connected to single app event. The visual wiring tool can support event message transformation to connect apps that may not be compatible as-is. Event message transformation can connect apps from different vendors or user groups.

Figure 2:
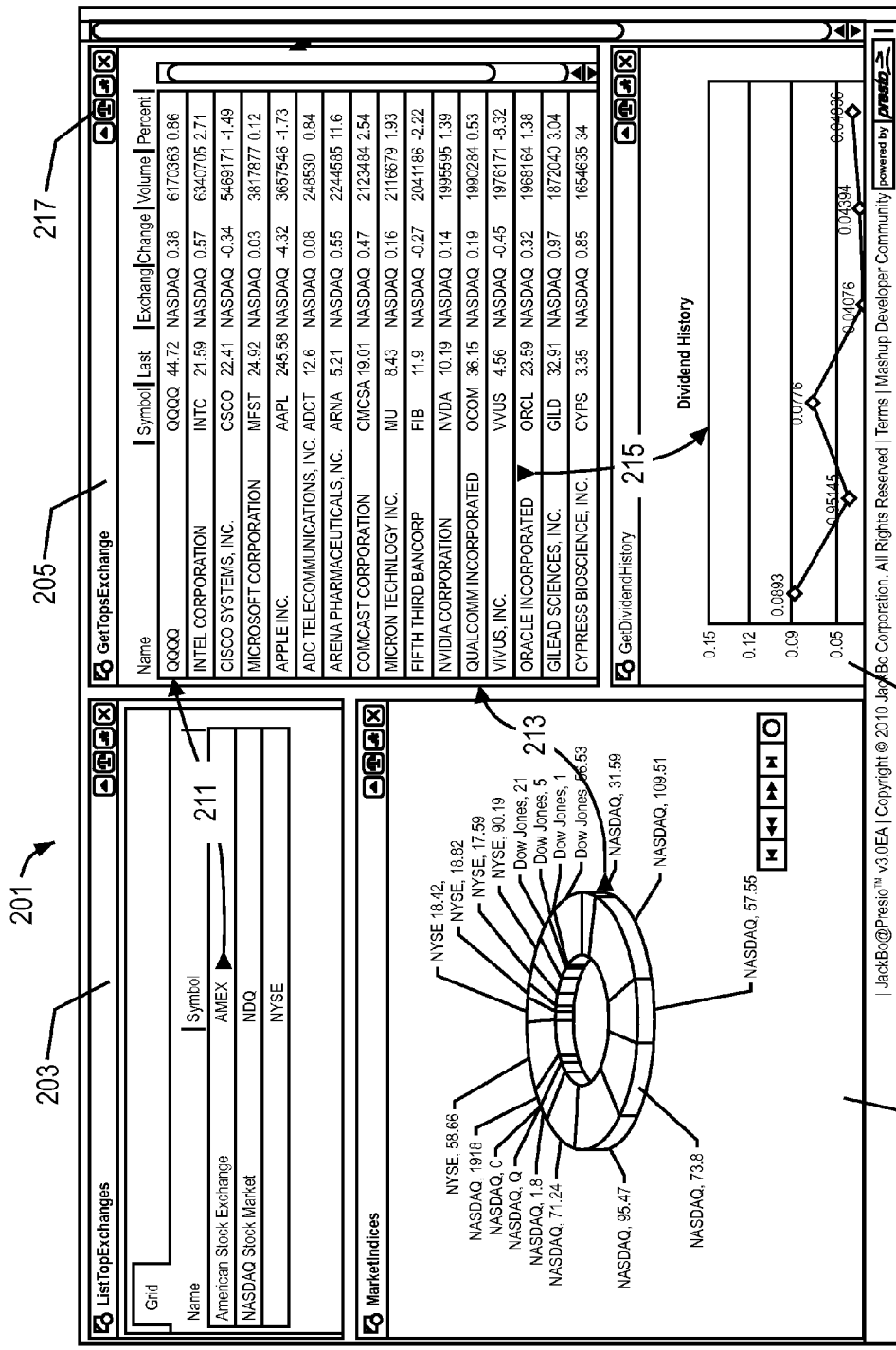
FIG. 2 is a second example user interface.
Figure 3:
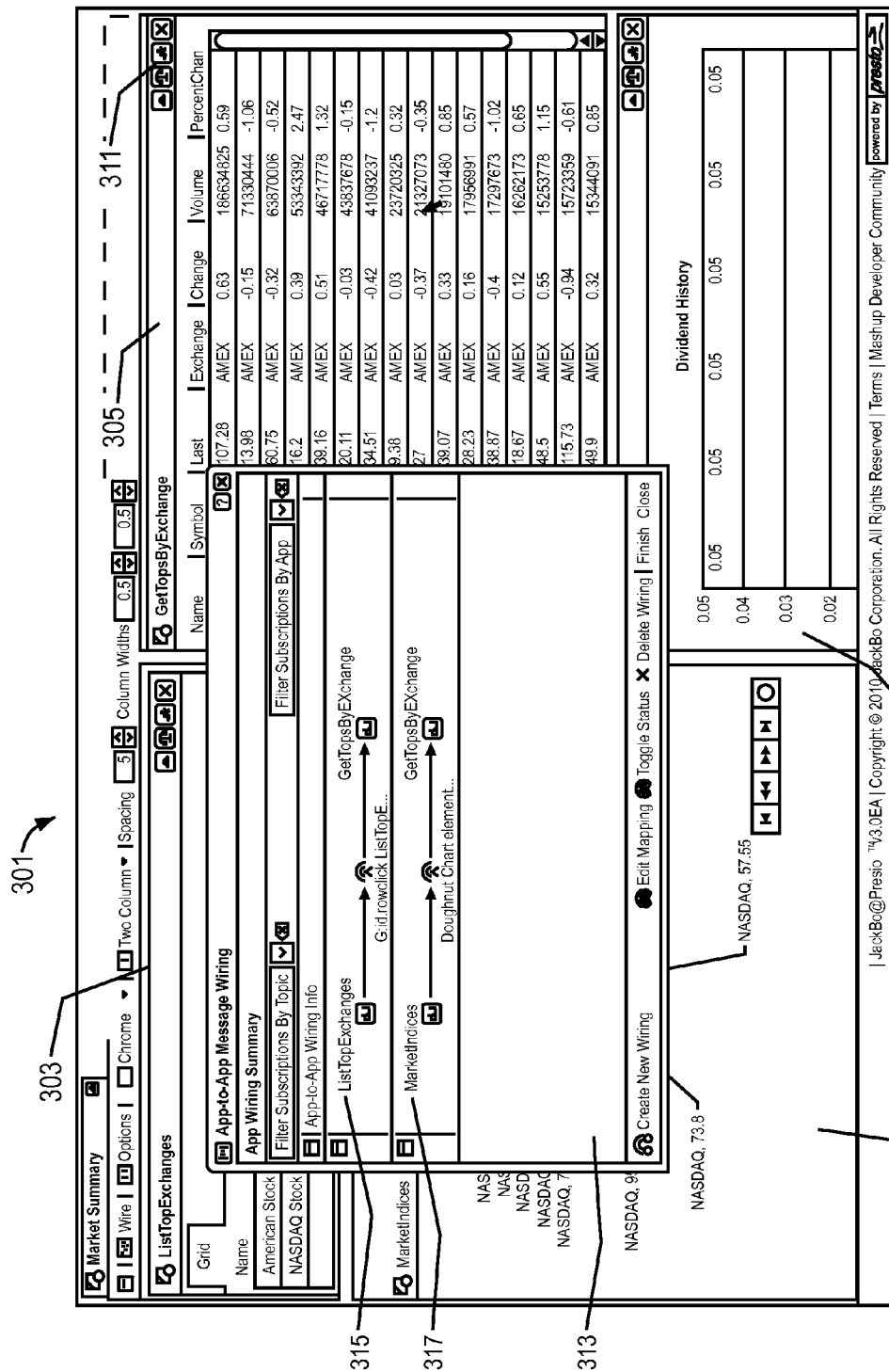
FIG. 3 is a portion of the second example user interface illustrating a top level summary.
Figure 4:
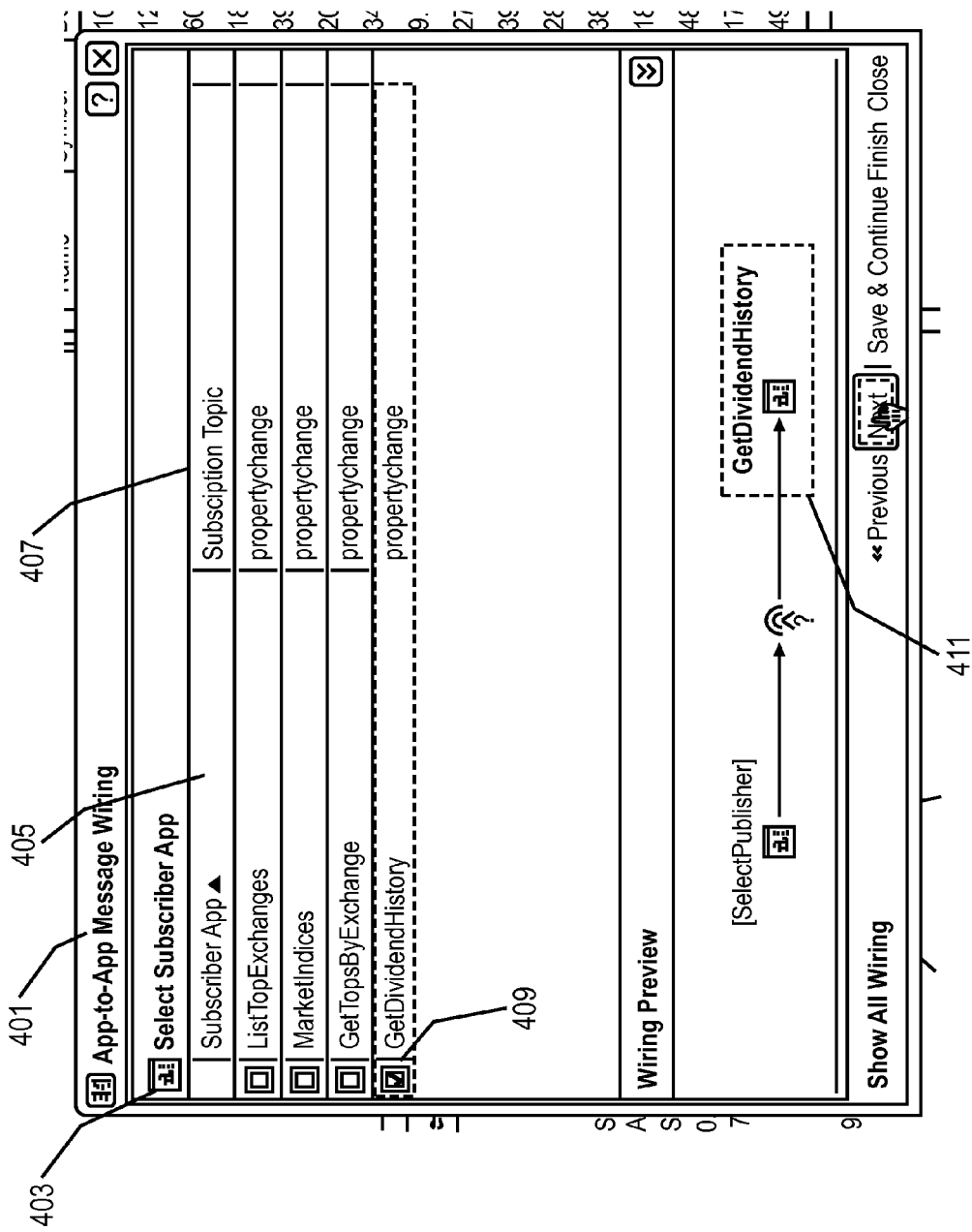
FIG. 4 is a portion of the second example user interface illustrating Step 1, Select Target/Subscriber App.
Figure 5:
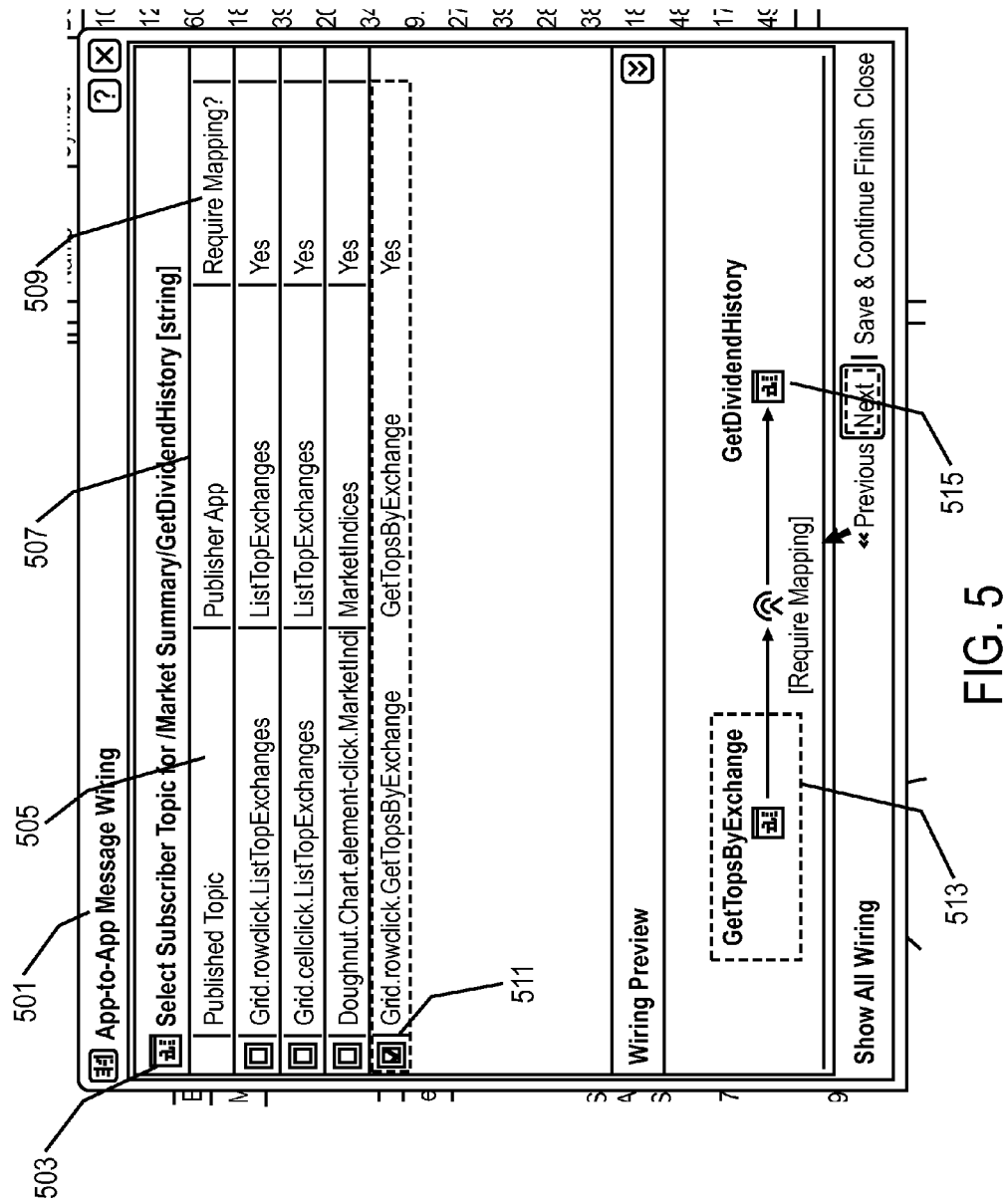
FIG. 5 is a portion of the second example user interface illustrating Step 2, Select Source/Publisher App.
Figure 6:
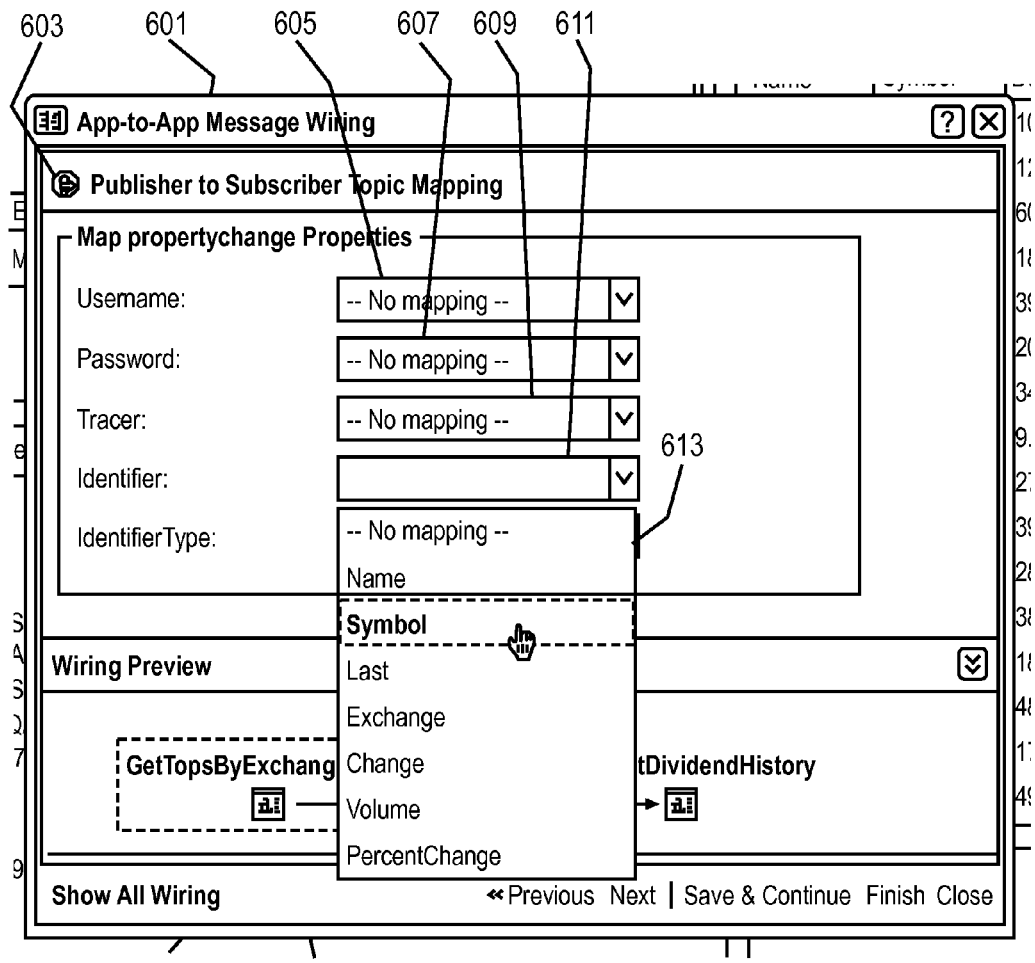
FIG. 6 is a portion of the second example user interface illustrating Step 3, Topic Mapping/Transformation.

Referring now to FIG. 2 to FIG. 6, a second example user interface 201 (sometimes referred to as the "source-destination-browser user interface") will be discussed. FIG. 2 is a second example user interface. FIG. 3 is a portion of the second example user interface illustrating a top level summary to set up the visual wiring. FIG. 4 is a portion of the second example user interface illustrating Step 1, Select Target/Subscriber App. FIG. 5 is a portion of the second example user interface illustrating Step 2, Select Source/Publisher App. FIG. 6 is a portion of the second example user interface illustrating Step 3, Topic Mapping/Transformation.

User Interface

The user can invoke the app wiring menu by clicking an app wiring menu button 217, e.g., FIG. 2. This brings up a screen with a list of options and can prompt the user to select the receiver of the message and the sender of the message, e.g., FIG. 3. In the example of FIG. 2, the app Grid 203 is sending a message 211 to the app GetTopicsByExchange 205. Also, the user can select GetDividendHistory app 209 as a receiver to receive a message 215 from GetTopicsByExchange 205 as the sender. Also, the user can select the app MarketIndices 207 as a sender to send a message 213 to the destination app GetTopicsByExchange 205. In this example, a wiring menu (see FIG. 3 to FIG. 4) is invoked by selecting a button 217 on one of the apps the user interface 201. Then, the user can map the parameters that come in from the message from the source app to the parameters of the destination app.

Referring now to FIG. 3 to FIG. 6, steps for a user interface to set up wiring between a source app and a destination app will be discussed and described. In FIG. 3, the user has invoked a message wiring menu 313 by selecting the app wiring menu button 311. FIG. 3 illustrates a user interface 301 with apps ListTopExchanges 303, GetTopicsByExchange (in the drawings, "GetTopsByExchange") 305, MarketIndices 307, and DividendHistory 309. The message wiring menu 313 can list subscriptions, and they can be filtered by the app that sends the subscription and/or the topic of the subscription. The message wiring menu 313 can list pairs of source app/destination app that are wired together, i.e., with the destination app already set to receive information which is a topic published by the source app. Here, a first visual wiring pair 315 is ListTopExchanges as a source app sending the topic Grid.rowclick.ListTopExchanges to the destination app GetTopicsByExchange (in the drawings, "GetTopsByExchange"); and a second visual wiring pair 317 is MarketIndices as a source app sending the topic DoughtnutChartElement.MarketIndices to the destination app GetTopicsByExchange (in the drawings, "GetTopsByExchange"). As shown in FIG. 4 to FIG. 6 (discussed in more detail below), from this menu a user can select a subscriber and a destination and set up mapping of information to be provided from the subscriber to the destination.

Then, now referring to FIG. 6, when the user clicks the "save & continue" or "finish" button on App-to-App Message Wiring menu 601, the source app is wired as a sender and the destination app is a receiver.

The app wiring menu can conveniently display all the current wiring and a user can disable one or more wiring by unselecting the publisher.

Consequently, the system can set up or disable eventing or messaging between two of the apps on the page.

Thus, a UI is provided with a visual display of the wiring so that a business analyst or end user (not a programmer) can accomplish the sending of information between two apps without writing custom code. The visual wiring metaphor that is provided can connect up information between these different artifacts on the page.

Mapping Incoming Parameters

Referring again to FIG. 1, in MashupGridView, a user can click on one of the displayed rows to send information from that row to a couple of the other apps on this page, namely, to ChartView and to GoogleMap. In the ChartView, for example, a user can have the label in the ChartView chart to use the information in the MashupGridView name columns and the value of the ChartView chart to use any numeric column from the MashupGridView. Also, a pushpin can appear on the GoogleMap when it receives the MashupGridView Lat and Long information (mapped to GoogleMaps latitude and longitude parameters) which is used to put the pushpin in the map. So the information can be visually wired by interacting with a user, so as to map the parameters for the data that is passed from one app to the other app.

Also note, in this example, a user selected a row of information (to pass to an app) that has four parameters, but the apps to which the parameters are passed only have two parameters. In the GoogleMap app there is no parameter that maps to the parameter in the sender called Name or ID, but these incoming parameters can be ignored in favor of the incoming parameters called "Lat" and "Long" which are mapped to the "Latitude" and "Longitude" parameters on the receiver, respectively.

Then, eventing can occur, for example according to known techniques. The destination app as it exists, for example, may choose to replace all information, or add to existing content when it receives information via the eventing. In the case of the ChartView app, it might add a bar. A different app might behave differently, according to how it is programmed. The point is that the destination app need not be re-programmed to accommodate the visual wiring, but the destination app, when executing, expects to receive data; one type of expected data in some apps (if present) can cause the destination app to initialize existing content, or to simply add newly received information to existing content.

Each of the apps (source app or destination app) can be a conventional app. A technique for eventing (transmitting information from one app) is conventional. In "eventing", an app fires an event, which causes a message to be published, for example, via OpenAjax Hub. The eventing can be a peer-to-peer passing of an event from the source app to the intermediary, and then from the intermediary to the destination app.

Previously, the code for passing the information had to be programmed by developer. In accordance with this disclosure, a technically less savvy person can generate the code using this visual wizard, (1) to attach the code to generate an event (which is targeted to the receiving app) to the apps that have registered interest in receiving events (eventing code is known); and (2) to attach code to receive the event (eventing code is known), and when the event is received from that app to map the incoming parameters to the parameters which the receiving app uses. As discussed later in more detail, the code added at an intermediary rather than at the destination app or source app.

"App" can refer to a single-purpose-type widget instead of a large overarching application.

Reference is now made again to FIG. 1.

The UI 101 of FIG. 1 illustrates setting up eventing or communication or data passing from one of the illustrated apps to others. E.g., in ServiceInvoker, when "Submit" is clicked, the user wants to pass information from ServiceInvoker 109 as a source app to TopicViewer 105 and to MashupGridView 111 as destination apps.

In this case, TopicViewer 105 shows the entire message 123 which was passed, in a raw form. MashupGridView 111 uses that to make a call to an app using the information 121 from ServiceInvoker 109.

A more typical example is to map parameters from, e.g., MashupGridView 111 as a source app to ChartView 107 as a destination app. Here, the "Name" and "ID" parameters in MashupGridView are mapped to the "Label" and "Value" parameters (respectively) in ChartView. Similarly, the Lat and Long parameters from MashupGridView are mapped to latitude and longitude parameters in GoogleMaps 113 as a destination app.

There is a known framework which can be used to execute the eventing, e.g., available from the OpenAjax client, e.g., OpenAjax Hub 2.0 (specified in the OpenAjax Hub 2.0 Specification), and variants and evolutions thereof.

Reference is now made to FIG. 4, a portion of the second example user interface illustrating Step 1, Select Target/Subscriber App. In FIG. 4, there is illustrated an app-to-app message wiring menu 401, a destination app menu 403 to select the subscriber app, a list of subscriber names (destination app candidates) 405 (in the drawings, "SubscriberApp"), a list of subscription topics (topic candidates) 407, an indication of the selected destination app 409, and a visual wiring display showing the name of the selected destination app 411. The arrow going into the destination app 411 visually indicates that the named destination app 411 will receive the information. To select a target/subscriber app, in this example, the UI wiring menu 401 shows the available apps 405, and the user selects one 409 as the target (to receive the information).

Reference is now made to FIG. 5, a portion of the second example user interface illustrating Step 2, Select Source/Publisher App. In FIG. 5, there is illustrated an app-to-app message wiring menu 501, a publisher topic menu 503 to select the subscriber app, a list of names of published topics (topic candidates) 505, a list of publisher names that correspond to the topics (source app candidates) 507, an indication of whether mapping is required between the destination information and the source information of that publisher (that is, when there is not a one-to-one correspondence between information), an indication of the selected published topic and source app 511, and a visual wiring display showing the name of the selected source app 513 (in the drawings, "GetTopsByExchange") and destination app 515. In this example, both the source app and destination app have been selected, and whether or not the source information and destination requires mapping can be automatically determined by whether there is a one-to-one correspondence between source and destination information; the user interface can show an indication when mapping is required. The arrow going into the destination app 411 visual indicates that the named destination app 411 will receive the information. To select the source/publisher, a menu 503 shows the available topics 505 and/or apps 507, and the user selects one 511 as the publisher (to send the information).

Reference is now made to FIG. 6, a portion of the second example user interface illustrating Step 3, Topic Mapping/Transformation. In FIG. 6, there are illustrated an app-to-app message wiring menu 601 and a publisher-to-subscriber topic mapping menu 603. To select the mapping of the parameters, the parameters of the publisher and the source are presented to the user, so the user can select the mapping of (1) which source parameter is received into which destination parameter, and (2) operations to transform the source parameter before being used as the destination parameter. Here, the publisher parameters are displayed on the left hand column (in this example, "username", "password,", "tracer", "identifier", and "identifiertype". There is a drop down menu 605, 607, 609, 611, 613 for each of the publisher parameters listing the subscriber/target parameters; see the drop down menu 613 for "IdentifierType" which lists each of the destination parameters, here "name", "symbol", "last", "exchange", "change", "volume," and "PercentChange". To indicate which source parameter is received into which destination parameter, the mapping menu 603 interacts to prompt the user to manually select one of the subscriber/target parameters 613 to match to one of the publisher parameters. There does not need to be a one-to-one mapping of parameters, that is, source parameters or publisher parameters can be omitted.

The names which are displayed for the source and destination parameters are the names of the content fields. The information will be supplied from the content fields with the selected names in the source, and the information will be used as content in the content fields with the selected names in the destination as indicated in the publisher to subscriber mapping. Content fields can be omitted.

Optionally, information can be transformed before being provided to the destination. An additional menu can be provided to specify a change of parameter type (e.g., numerical to text), to augment information, to execute a calculation on information (e.g., to change percent to ratio), and the like.

Figure 7:
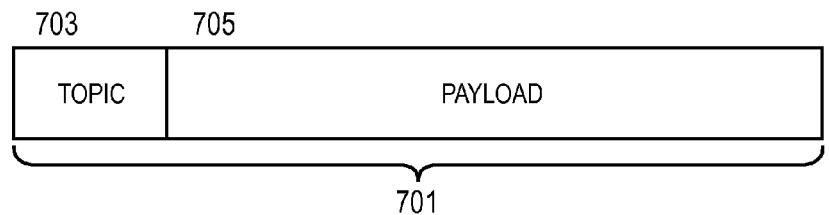
FIG. 7 is a block diagram illustrating a message format.

Referring now to FIG. 7, a block diagram illustrating a message format will be discussed and described. In this example, a message 701 can include a topic 703 (as the message header) and a payload 705. The topic 703 specifies a string name describing the published message, generally prefixed by the app name followed by a ".". The payload 705 holds the data payload of the message, typically the app name, properties of the data, and the data itself as determined by the publisher of the message. A further description of the format and message passing conventions and conventions for names of topics according to some embodiments can be located in the OpenAjax 2.0 specification. According to some conventions, a topic name can embed a name of the source of the message. A message 701 can be broadcast from a source app, for example by invoking an available publish feature. A message 701 can be subscribed to by invoking an available subscribe feature.

According to OpenAjax, a publisher will publish a message when a new event occurs, e.g., whenever data is changed. The message can be broadcast—a publisher can be unaware of who the subscribers are or how many subscribers there are. According to OpenAjax, a subscriber that wants to be notified whenever an event occurs includes executable program code (1) first to subscribe to the event and (2) next to do something in response to the event and its data when received.

As described further herein, there is no need for a destination app to subscribe to the event. The source app publishes the message 701 as usual; an intermediary is subscribed to the topic published by the source app and receives the published message 701. Then, the intermediary performs any specified source-to-destination mapping to the information carried in the payload 705 of the message 701, before sending the mapped information to the destination app. If the destination app can receive a message 701, the information can be sent in a message; if the destination app expects to receive information as data provided by an information service such as a web feed format, e.g., RSS (really simple syndication), the information can be sent in the standardized format expected by the destination app, e.g., RSS format.

Figure 8:
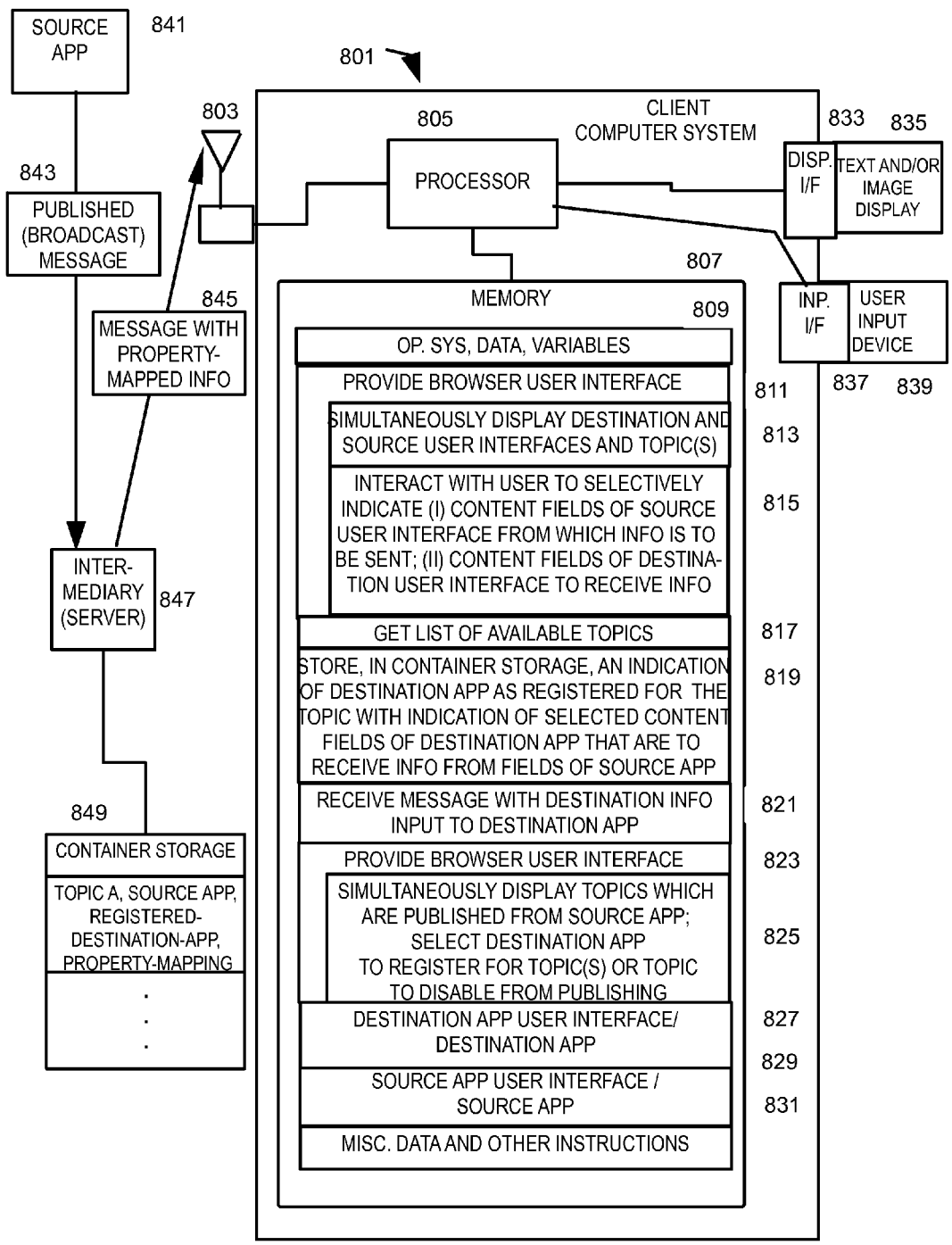
FIG. 8 is a block diagram illustrating portions of a client computer system and an environment thereof.

Referring now to FIG. 8, a block diagram illustrating portions of an exemplary client computer system and an environment thereof will be discussed and described. The computer system 801 may include a communication port and/or transceiver 803 or the like for communication with an intermediary, e.g., a server 847, a processor 805, a memory 807, a display interface 833, a display 835, an input interface 837, and/or a user input device 839 such as a keyboard, trackball, mouse, joystick, pointing device, and/or similar.

The server 847 can be a part of a platform comprising the server 847 and a client app which can execute on the processor 805 of the computer system 801. Server and client functions can be distributed between the server 847 and the client app according to known techniques. The client app on the client computer system 801 can invoke one or more web services as an information-providing services as is known to obtain data from a data source.

The illustrated communication port/transceiver 803 is representative of one or more receiver and/or transmitter and/or transceiver communication ports, for wired or wireless communication, over a computer network or communication network.

Also, the intermediary (server) 847 can access a container storage 849 on which topics can be stored, each topic indicating a source app (here represented by source app 841) that publishes the topic as a published message 843 and one or more destination apps which have registered to receive the topic and a property-mapping from source information to destination information so that the intermediary (server) 847 can send a property-mapped message 845 with property-mapped information. The container storage 849 can be a database.

The processor 805 may comprise one or more microprocessors and/or one or more digital signal processors. The memory 807 may be coupled to the processor 805 and may comprise a read-only memory (ROM), a random-access memory (RAM), a programmable ROM (PROM), and/or an electrically erasable read-only memory (EEPROM). The memory 807 may include multiple memory locations for storing, among other things, an operating system, data and variables 809 for programs executed by the processor 805; computer programs for causing the processor to operate in connection with various functions such as to provide 811 a browser user interface that interacts with the user to set up source-destination wiring, get 817 list of available topics, register and store 819 a registered destination app and wiring, receive 821 a message with info for destination app, provide 823 a browser user interface that displays published topics and selects or disables topics accordingly, a destination app user interface/destination app 827, a source app user interface/source app 829, and/or other processing; and a database 831 for other information used by the processor 805. The computer programs may be stored, for example, in ROM or PROM and may direct the processor 805 in controlling the operation of the computer system 801. Each of these functions is considered in more detail below.

The user may invoke functions accessible through the user input device 839, interface with the processor 805 through an input interface 837. The user input device 839 may comprise one or more of various known input devices, such as a keyboard and/or a pointing device, such as a mouse; the keyboard may be supplemented or replaced with a scanner, card reader, or other data input device; the pointing device may be a mouse, touch pad control device, track ball device, or any other type of pointing device; and the input interface 837 can be a known interface thereof to communicate with the processor 805.

The text and/or image display 835 is representative of a display that may present information to the user by way of a conventional liquid crystal display (LCD) or other visual display, and/or by way of a conventional audible device for playing out audible messages. The display interface 833 can be a known interface thereof to communicate between the processor 805 and the display 835.

Responsive to signaling from the user input device 839, in accordance with instructions stored in memory 807, or automatically upon receipt of certain information via the communication port and/or transceiver 803, the processor 805 may direct the execution of the stored programs.

The processor 805 can be programmed to provide 811 a browser user interface (sometimes referred to as the "source-destination-browser user interface") that interacts with the user to set up source-destination wiring, as described above in much detail. The browser user interface interacts with the user to select, as a source app, one of the source apps that publishes information. The browser user interface also interacts with the user to select, as a destination app, an app that can receive information for examples information sent from a data service. Candidate names of destination apps can be obtained from apps which are known to the client computer system 801 as available apps in accordance with known techniques. The browser user interface can display, simultaneously, for example on a single screen, and/or in a same window, the destination app user interface (or name(s) thereof) and the source app user interface (or name(s) thereof) and the topic(s) which are published. The browser user interface can obtain the names and descriptions of the content fields of the source app from which information is to be sent and of the destination user interface which are to receive the information. In the event that there is not a perfect relationship between the respective content fields (i.e., the number of fields differs or the type of content of the fields differs), the user interface can interact with the user to select which source fields go to which destination fields and also to determine manipulations which are to be performed on the source information before being sent to the destination app.

The processor 805 can be programmed to get 817 list of available topics, that is, the topics which are published, and/or the apps which provide published messages. The list can be retrieved by transmitting a message requesting the list to the intermediary (server) 847 from the client computer system 801; and by receiving a message listing the topics and/or apps, optionally with registered destination apps and property mapping information. The intermediary (server) 847 can be programmed, upon receipt of a message requesting such a list, to retrieve a list of topics and associated source apps and so forth from the container storage 849. Such a list can be used to support the browser user interface 811 that displays the available source apps and topics.

The processor 805 can be programmed to register and store 819 an indication of a destination app as registered for the topic from the source app, with an indication of the selected content fields of the destination app that are to receive information from selected content fields of the source app, as well as any property mapping between the respective source and destination content fields. The processor 805 can collect the information, for example, via a browser user interface 811 that interacts with the user to set up the app wiring, and can store the app wiring by transmitting a message sending the app wiring information to the intermediary (server) 847 to be stored in the container storage 849.

The processor 805 can be programmed to receive 821 a message with information for the destination app 827. The destination app 827 can be set up, according to conventional app techniques, to receive data or to retrieve data. The message with information for the destination app can be the message 845 sent from the intermediary (server) 847 that has the property-mapped information. The destination app 827 can accept the information without discriminating the source of the information. Accordingly, the destination app 827 will handle the message with the property-mapped info the same as it handles its usual data.

The processor 805 can be programmed to provide 823 a browser user interface that displays 825 published topics and select or disable topics accordingly. The browser user interface 823 can simultaneously display topics which are published by one or more source apps (e.g., in a list), can select one or more of the destination apps to be registered for one of the topics that is published, and/or can set one or more of the published topics to be disabled from publishing.

The list of available topics can be obtained by sending a message with a request for the list to the intermediary (server) 847 and receiving the list therefrom.

The browser user interface 823 can interact with the user to select one or more of the destinations apps to be registered to receive information from one or more of the listed available topics. The registered destination and topic, along with any property mapping, can be sent to be stored 819 in the container storage.

One or more of the published topics can be sent in a message with a request to be disabled to the intermediary (server) 847, which can temporarily mark the topic in the container storage 849 as being disabled. When the intermediary (server) 847 receives a published message 843 for a disabled topic, the intermediary 847 can omit to send the message with the information 845 to the client computer system 801.

The processor 805 can be programmed with a destination app user interface/destination app 827, and/or with a source app user interface/source app 829. An app can be set up using known techniques to broadcast a message, usually when an event occurs such as when data (which likely is displayed) is added, deleted or modified. An app conventionally can be set to receive the data or to retrieve the data from a server without interfering with the display of the existing page, with the retrieved data to be displayed such as on the existing page. Conventional techniques for doing so include AJAX and similar web applications. Typically, according to conventional techniques, the client side of the app provides a user interface; a server side of the app may be provided, for example on a remote server.

The computer system 801 discussed here or elsewhere in this document can include a central processing unit (CPU) with disk drives (not illustrated), symbolic of a number of disk drives that might be accommodated by the computer. Typically, these might be one or more of the following: a floppy disk, a hard disk, a CD ROM, a digital video disk, an optical disk, a removable flash memory, or the like, or variations thereof. The number and type of drives may vary, typically with different computer configurations. Disk drives may be options, and for space considerations, may be omitted from the computer system used in conjunction with the processes described herein. The computer may also include a CD ROM reader and CD recorder, which are interconnected by a bus along with other peripheral devices supported by the bus structure and protocol (not illustrated). The bus can serves as the main information highway interconnecting other components of the computer, and can be connected via an interface to the computer. A disk controller (not illustrated) can interface disk drives to the system bus. These may be internal or external.

It should be understood that FIG. 8 is described in connection with logical groupings of functions or resources. One or more of these logical groupings may be omitted from one or more embodiments, for example, the functionality of providing 811 a browser user interface that interacts with the user to set up source-destination wiring, can be omitted and/or performed on a different processor from the functionality of the browser user interface 823 that registers 825 for topics and/or disables from publishing, which can be provided on a different processor than the destination app user interface/destination app 827 and/or source app user interface/source app 829. Likewise, functions may be grouped differently, combined, or augmented without parting from the scope. Similarly the present description may describe various databases or collections of data and information. One or more groupings of the data or information may be omitted, distributed, combined, or augmented, or provided locally and/or remotely without departing from the scope.

Figure 9:
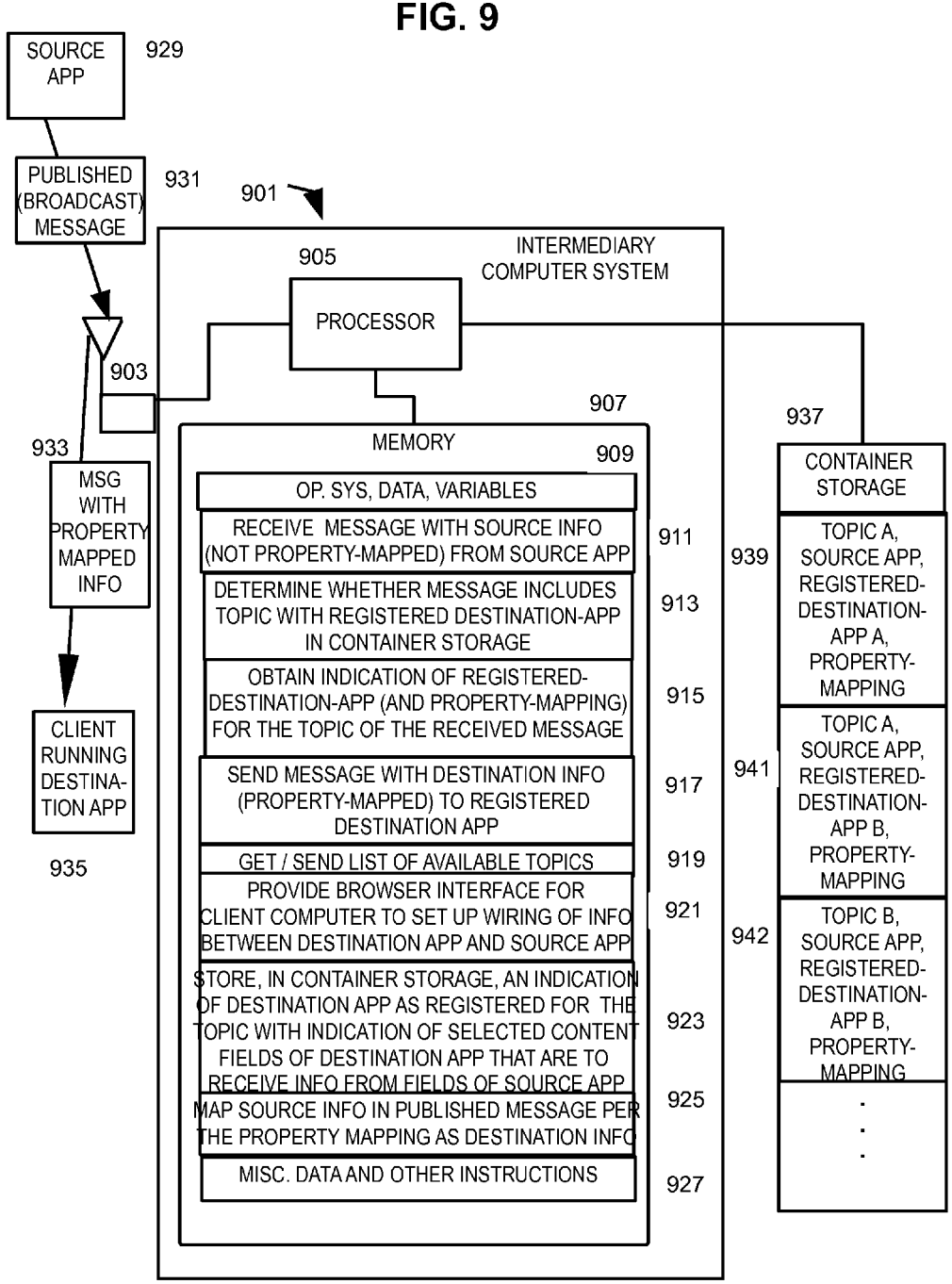
FIG. 9 is a block diagram illustrating portions of an intermediary computer system and an environment thereof.

Referring now to FIG. 9, a block diagram illustrating portions of an intermediary computer system and an environment thereof will be discussed and described. The computer system 901 may include a communication port and/or transceiver 903 or the like for communication, e.g., with a computer such as client 935 or source app 929 running on another computer; a processor 905, and a memory 907; a display and/or an input device may be included or omitted Other portions are not omitted from the present discussion because they are well understood in this field.

The communication port/transceiver 903 is representative of one or more receiver and/or transmitter and/or transceiver communication ports, for wired or wireless communication, over a computer network or communication network.

Also, the computer system 901 can access a container storage 937 on which topics 939, 941, 942 can be stored, each with an indication of a source app that publishes the topic, a registered destination app, and any property mapping. The source app, here represented by source app 929, publishes the topic as a published message 931 that can be broadcast in accordance with known techniques to any app that is listening for published broadcast messages. The computer system 901 can receive the published (broadcast) message 931 at the transceiver 903. The computer system 901 can send a message 933 from the transceiver to a client computer system running a destination app 935. The container storage 937 can be a database.

The processor 905 may comprise one or more microprocessors and/or one or more digital signal processors. The memory 907 may be coupled to the processor 805 and may comprise a read-only memory (ROM), a random-access memory (RAM), a programmable ROM (PROM), and/or an electrically erasable read-only memory (EEPROM). The memory 907 may include multiple memory locations for storing, among other things, an operating system, data and variables 909 for programs executed by the processor 905; computer programs for causing the processor to operate in connection with various functions such as to receive 911 a message with source information, determine 913 whether the message includes a topic with a registered destination app, obtain 915 an indication of the registered destination app for the received message, send 917 the message with the property-mapped destination information to the registered destination app, get/send 919 a list of available topics, provide 921 a browser interface for the client computer to set up visual wiring, store 923 the registered destination app in the container storage, map 925 source information in the published message, and/or other processing; and a database 927 for other information used by the processor 905. In accordance with instructions stored in memory 907, upon receipt of manual instructions from an input device (not illustrated), or automatically upon receipt of certain information via the transceiver 903, the processor 905 may direct the execution of the stored computer programs, and the computer programs may direct the processor 905 in controlling the operation of the computer system 901 to perform functions. Each of these functions is considered in more detail below, although details which have been discussed previously may be omitted to avoid redundancy.

The processor 905 can be programmed to receive 911, via the transceiver 903, a message with source information from the source app 929 which is listed in the container storage 937, in accordance with available techniques for receiving messages. For example, the processor can be set to receive all broadcast messages or message regarding topics listed in the container storage 937, such as via OpenAjax Hub subscribe API or similar, variations and extensions thereof. The source app 929 is set to send messages when data therein is added or updated, for example, by anonymously broadcasting messages or passing messages instead of using point-to-point message, for example using OpenAjax Hub publish API, extensions and variations thereof. The source app 929 does not send the message to the destination app 935 since (1) the destination app 935 is not configured to receive the published message 931, and (2) the intermediary computer system 901 will send a message to the destination app in a way which does not require the destination app to be specially adapted to the message.

The processor 905 can be programmed to determine 913 whether the message includes a topic with a registered destination app, when the processor 905 receives a message. For example, the processor can determine whether the topic of the message is included in the container storage 937, using known techniques.

The processor 905 can be programmed to obtain 915 an indication of the registered destination app for the received message. For example, when it is determined that the topic of the message is included in the container storage 937, the processor 905 can access the container storage 937 to retrieve the name(s) of destination apps which are registered for the topic as well as the corresponding property-mapping for the topic and destination app(s).

The processor 905 can be programmed to send 917 the message with the property-mapped destination information to the registered destination app, after performing a property mapping 925 on the information in the message from the source app. The information that was received in the message from the source app 929 is property mapped 925 and then placed into a message 933 to be transmitted to the computer system 935 running the destination app as specified in the container storage 937 for the topic of the received message 931. The message 933 then is transmitted via the transceiver 903 from the intermediary computer system 901 to the computer system 935 running the destination app. The message can be transmitted from the computer system 901 to the destination in accordance with known techniques. For example, the destination app can be set to receive data (specific input parameters) from an information providing service, e.g., RSS, using known techniques; the message 933 with the property map information can be sent to the destination app in the same form as the information providing service.

The processor 905 can be programmed to get/send 919 a list of available topics, for example when the processor 905 receives a message via the transceiver 903 with a request for a list of available topics. In response to receiving the message, the processor 905 can retrieve the available topics and corresponding indications of registered destination apps and property mapping (if any) 939, 941, 942. Then, the processor 905 can transmit a message with a response having the list of available topics, for example via the transceiver 903 to the requesting processor, for example, the client 935.

The processor 905 can be programmed to provide 921 a browser interface for the client computer to set up visual wiring of information between the destination app and the source app. The browser interface has been discussed elsewhere herein in detail. The browser interface can be provided to be downloaded to the client computer system, or can be distributed in accordance with known techniques between the client computer system and the intermediary computer system 901, or can principally or entirely on the intermediary computer system 901. When the browser interface to set up wiring is provided at least partly on the client computer system, the intermediary computer system 901 can receiving the wiring parameters (that is, the topic, the source app, the destination app, and the property mapping) from the client computer system via the transceiver 903.

The processor 905 can be programmed to store 923, in the container storage 937, an indication of the destination app as being registered for the topic, with an indication of the selected content fields of the destination app that are to receive information from fields of the source app, together with instructions for mapping the source information to the destination information.

The processor 905 can be programmed to map 925 information from the source app (referred to sometimes as "source information") as specified in the property mapping stored in the container storage 937 for the topic in connection with the destination app, so that the information is in the format expected by the destination app (referred to sometimes as "destination information"). Different ways to map information from a source to a destination are known. For example, information from a source which is provided as two parameters (source (A, B)) and be re-positioned to a destination as two parameters (destination (B, A)); a parameter can be omitted (source (A, B) mapped to destination (B)); and similar. Also, information which is provided as a string can be recast as an integer, or similar. Different ways of mapping information are known and can be used alone or in combination. Accordingly, in one or more embodiments, the mapping includes omitting a portion of the information, recasting at least a portion of the information to a different data-type, extraction of at least a portion of the information, performing a calculation on the information, performing a string manipulation on the information, augmenting the information, so as to conform information that is not compatible as-is from the source app to the content fields displayed at the destination user interface which are to receive the information.

It should be understood that FIG. 9 is described in connection with logical groupings of functions or resources. One or more of these logical groupings may be omitted from one or more embodiments. Likewise, functions may be grouped differently, combined, or augmented without parting from the scope. Similarly the present description may describe various databases or collections of data and information. One or more groupings of the data or information may be omitted, distributed, combined, or augmented, or provided locally and/or remotely without departing from the scope.

Figure 10:
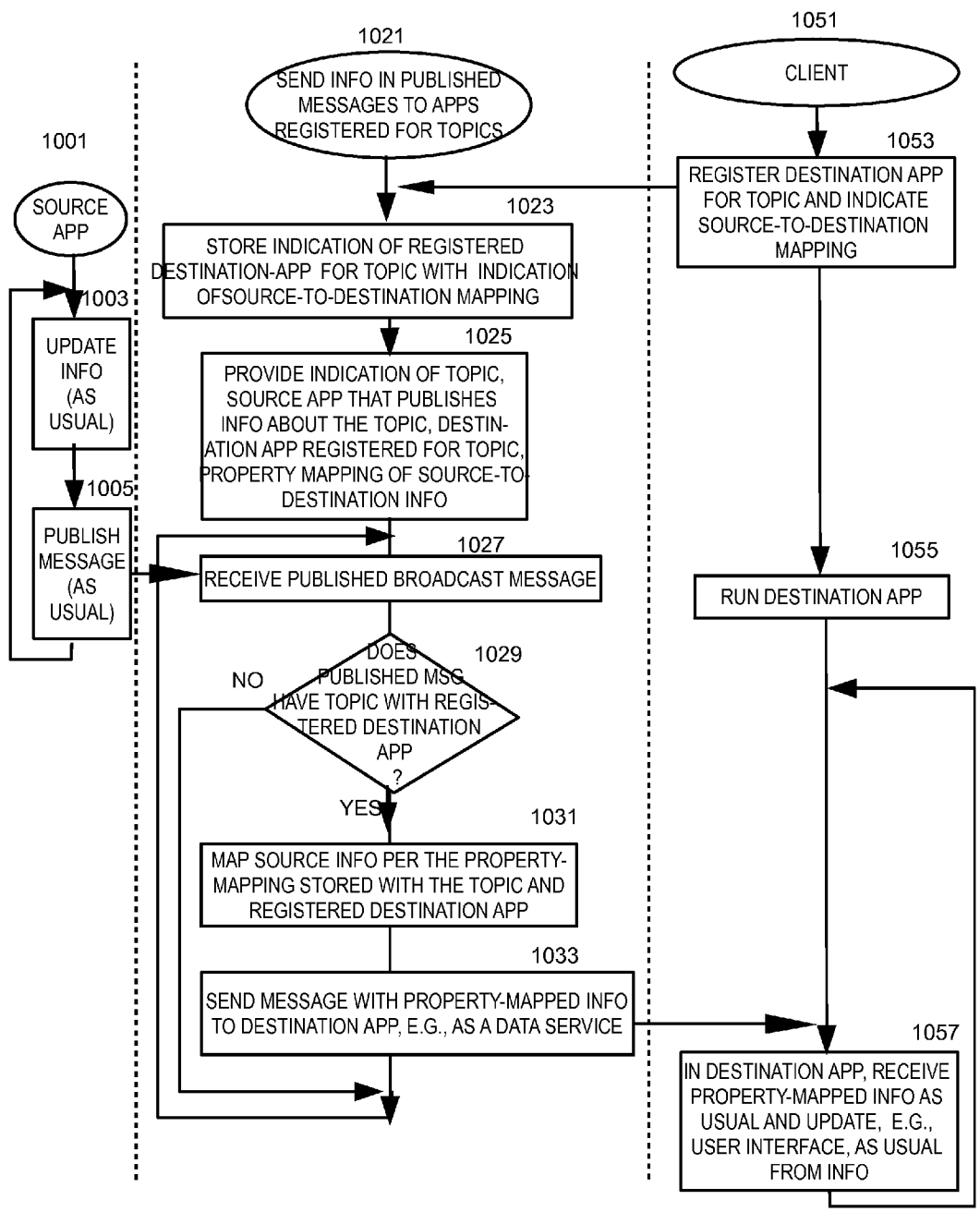
FIG. 10 is a flow chart illustrating a process for visual wiring of apps.

Referring now to FIG. 10, a flow chart illustrating a process for visual wiring of apps will be discussed and described. The flow chart illustrates parallel flows for a source app procedure 1001, a client procedure 1051, and for sending 1021 information in published messages to apps registered for topics. The client procedure can advantageously be implemented on, for example, a processor of a client computer system, such as described in connection with FIG. 8 or other apparatus appropriately arranged. The procedure for sending 1021 information to apps registered for topics can advantageously be implemented on, for example, a processor of an intermediary computer system, such as described in connection with FIG. 9 or other apparatus appropriately arranged. The source app 1001 procedure conventionally is implemented on a computer system in accordance with known techniques.

The source app 1001 is conventional, and executes a loop in which its information is updated 1003 as usual; and then a message with the updated (or deleted or added) information is published 1005 as usual. A source app can publish limited information, e.g., just a single cell, or much more information. A convenient example is a stock market app that provides stock market quotes, possibly limited to one or several stocks. When one of the stock quotes is updated, then the source app will publish a broadcast message with a topic and with the updated information. Because the source app 1001 is conventional, no further details are provided herein.

Also in overview, the client procedure 1051 initially registers 1053 a destination app for a selected topic along with an indication of the source-to-destination mapping. As discussed above, the registered destination app, topic and source-to-destination mapping are transmitted to a procedure that provides for sending 1021 the requested information to the destination app. The client procedure 1051 also provides for later running 1055 the destination app which was registered; and while the destination app is running, to receive 1057 information as is normal for the destination app and to update the user interface from the received information. While running the destination app, the client procedure loops to continue receiving 1057 information and updating in reaction thereto as usual. Destination apps are conventional, and can receive parameters in a pre-determined format. Destination apps generally do not receive published broadcast messages, because that would require, among other things, subscribing to messages as well as hand-shaking and error checking for the desired messages. An example of an app is a line graphing app, which automatically inserts and displays items (which are received as parameters) in a line chart. Because destination apps 1055, 1057 are conventional, no further details are provided herein.

Reference is now made to the procedure to send 1021 information in published messages to apps registered for topics. The procedure can store 1023 an indication of a registered destination app which has registered for a selected topic, together with an indication of the source-to-destination mapping of information from the source app to the destination app. Also, the procedure can subscribe to receive the topic. Mapping has been discussed previously in detail.

The procedure 1021 can optionally provide 1025 an indication of one or more topics, and for each of the topics, the source app that publishes information about the topic, the destination app(s) registered for the topic, and the property mapping of the source-to-destination information.

Then, the procedure 1021 can receive 1027 a published broadcast message. Because the procedure 1021 can be subscribed to many topics, the procedure checks 1029 whether the published message has a topic with a registered destination app. If not, the published message can be discarded. However, when the published message has a topic with one or more registered destination apps, the procedure will map 1031 the source information included in the published message according to the property-mapping stored with the topic and the indication of the registered destination app. Then the procedure can insert the property-mapped information into a message as parameters in the predetermined format expected by the destination app. Then, the procedure 1021 can send 1033 a message to the destination app, wherein the message has the property-mapped info; the message is sent in a format and/or by a data service that will be recognized by the destination app. Then, the procedure repeats to receive 1027 another published broadcast message and to handle the other received published messages are discussed herein.

The following is a simple example of operation of the illustrated procedure of FIG. 10. Assume that the source app 1001 is the stock quote app which will provide stock quotes as text for one or more requests stocks. Assume that the destination app is a line graph app and plots a line between numerical data points. The destination app registers 1053 to receive a topic for quotes for one single stock. Then the procedure to send info 1021 to the registered apps stores the indication of the registered destination app for the topic with the indication of the source-to-destination mapping (change text to numerical data); and also subscribes to the topic. The source app may receive updated information from its usual data source, causing the quote for stocks to change, including the single stock for which the topic is subscribed. The source app 1001 updates 1003 its information (as usual), and publishes 1005 a message with the topic (as usual), the message having the updated information for at least the single stock and possibly others. Then, the published broadcast message with the topic is received 1027. Because a destination app registered for the topic 1029, the source information in the message is mapped 1031 to the destination information (here, only the content field for the single stock is used and its text is changed to a numerical data point), and a message is sent 1033 with the property-mapped information to the line graph which is the destination app in this example. The line graph destination app receives 1057 the message as usual, the message having the property-mapped information, and displays the data points as usual in the line graph. The stock quote app and the line graph app are unaware of each other; nevertheless information that changes quotes for that stock causes a change in both the source app and the destination app (the line graph app).

If the destination app publishes information, the destination app itself can be a source app for yet another destination app.

The above discussion has involved particular examples. However, the principles apply equally to other examples and/or realizations. Naturally, the relevant data may differ, as appropriate. Further, the above has been discussed in certain examples as if made available by a provider to a single user at a single site. The above described system, device and/or method may be used by numerous users over distributed systems, if preferred.

It should be noted that the term "computer system" used herein denotes a device sometimes referred to as a computer, laptop, main frame computer, personal computer, personal digital assistant, personal assignment pad, notebook computer, notepad computer, smart phone with embedded processor, or equivalents thereof provided such unit is arranged and constructed for operation with an app. As one example, the computer system may be a general purpose computer, or a specially programmed special purpose computer. It may be implemented as a distributed computer system rather than a single computer. Similarly, a communications link may be World Wide Web, a modem over a POTS line, and/or any other wired or wireless method of communicating between computers and/or users. Moreover, the processing could be controlled by a software program on one or more computer system or processors, or could even be partially or wholly implemented in hardware.

Furthermore, the communication networks of interest include those that transmit information in packets, for example, those known as packet switching networks that transmit data in the form of packets, where messages can be packetized and routed over network infrastructure devices to a destination. Such networks include, by way of example, the Internet, intranets, local area networks (LAN), wireless LANs (WLAN), wide area networks (WAN), cellular telephone networks, general packet radio service (GPRS) services, GSM (global system for mobile communications) cellular network, and others, and can be supported by networking protocols such as TCP/IP (Transmission Control Protocol/Internet Protocol) and UDP/UP (Universal Datagram Protocol/Universal Protocol) and/or other protocol structures, and variants and evolutions thereof. Such networks can provide wireless communications capability and/or utilize wireline connections such as cable and/or a connector, or similar. Any appropriate communication protocol may be used.

The term "app" is short for "application," and denotes a computer executable software program that performs a function to benefit the user; typically the term "app" is used to refer to discrete applications that provide a single function and a simple user interface; an "app" is a way to visualize a mashup; an "app" is different from an operating system that runs the computer. The term "app" is sometimes used to refer to programs such as GoogleMaps.

For the purpose of this patent application, a "mashup" is defined as a software application that combines pre-existing components from one or more information-providing services into a single tool which can comprise a server-side and a client-side application, where the components used by the mashup are visually presented to a user on a display at the client-side in a manner which is different from the pre-determined presentation of the information-providing service; and is configured in accordance with standards such as Enterprise Mashup Markup Language ("EMML"), XML interchanged as REST or Web Services, RSS, Atom, and other evolutions and variations of mashup standards. A mashup is to be distinguished from a portal in which content is presented side-by-side in the manner which is the same as the pre-determined presentation of the information-providing service. The designation "component" as used in this paragraph refers to data which is retrieved by a mashup in real-time from an information-providing service. A mashup is frequently made by access to open APIs and other data sources to produce results that were not the original reason for producing the raw source data. An example of a mashup is the use of cartographic data from Google Maps to add location information to real estate data, thereby creating a new and distinct Web service that was not originally provided by either source.

The term "service", sometimes referred to herein as an "information-providing service", is used herein expressly to refer to an information-providing service that provides data from a server in a visual presentation on a display to a user, typically an application programming interface (API) or web API that can be accessed over a computer network and executed on a remote system hosting the requested services, in accordance with Extensible Markup Language messages that follow the Simple Object Access Protocol (SOAP) standard such as SOAP Version 1.2 specification, Web Services Description Language (WSDL) such as Web Services Description Language Version 2.0 Specification, Representational State Transfer (REST) constraints, and variations and evolutions thereof. An example of a service is Google Maps, a Web service or an RSS feed.

The term "widget" as used herein is defined to be a stand-alone application which comprises a portable chunk of code that can be installed and executed within a separate HTML-based web page by an end user without requiring additional compilation. A widget frequently is written to use DHTML, JavaScript, or Adobe Flash, variations and evolutions thereof. Widgets often take the form of on-screen tools (clocks, event countdowns, auction-tickers, stock market tickers, flight arrival information, daily weather, etc.).

A computer-readable storage medium is tangible and non-transitory; a computer-readable storage medium can be any of the memory or disks, such as those examples described above, or other removable or fixed storage medium.

One or more displays for the system may be developed in connection with HTML display format. Although HTML is the preferred display format, it is possible to utilize alternative display formats for interacting with a user and obtaining user instructions.

The system used in connection with various embodiments may rely on the integration of various components including, as appropriate and/or if desired, hardware and software servers, applications software, database engines, server area networks, firewall and SSL security, production back-up systems, and/or applications interface software. The configuration may be, preferably, network-based and optionally utilizes the Internet as an exemplary interface with the user for information delivery.

The various databases may be in, for example, a relational database format, but other standard data formats may also be used. Windows 2007, for example, may be used, but other standard operating systems may also be used. Optionally, the various databases include a conversion system capable of receiving data in various standard formats.

The foregoing detailed description includes many specific details. The inclusion of such detail is for the purpose of illustration only and should not be understood to limit the invention. In addition, features in one embodiment may be combined with features in other embodiments of the invention. Various changes may be made without departing from the scope of the invention as defined in the following claims.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. An intermediary computer system, comprising:
a container storage; and
an intermediary processor cooperatively operable with the container storage, and configured to:
provide, in the container storage, a plurality of registrations, each registration includes:
(i) an indication of a topic among a plurality of topics,
(ii) an indication of a source app, among a plurality of source apps, that publishes, directly to subscribers, information, displayed on a source user interface of the source app, regarding the topic,
(iii) an indication of a destination app registered at the intermediary processor for the topic to receive the information regarding the topic from the intermediary processor, and
(iv) a property mapping indication of how fields in the information published by the source app map to fields in destination information displayed at a destination user interface of the destination app, wherein different registrations in the container storage for a same topic-source app combination support different property mappings for different destination apps;
subscribe, by the intermediary processor, to the topic published by the source app;
receive, in response to the subscription, at the intermediary processor, a published message from the source app, the published message including the information sent from the source app and not property-mapped according to the property mapping in the container storage; and
responsive to receipt of the published message from the source app:
determine, at the intermediary processor, registrations in the container storage which indicate that there is a registered destination app which is registered for the topic in the published message from the source app, and then
for each registration which indicates that there is a registered destination app registered for the topic in the published message from the source app,
property-map the fields in the source information in the published message to the fields in the registered destination app according to the property mapping stored with the topic and the registered destination app in said registration in the container storage, to generate destination information, when it is determined that the registered destination app is registered for the topic in the published message, and then
send, from the intermediary processor, to the registered destination app which is determined to be registered for the topic, the generated destination information which has been property-mapped according to the property mapping in said registration in the container storage, when it is determined that the registered destination app is registered for the topic in the published message, so that publication caused by a change to the information at the source app triggers, via the intermediary processor, a reaction in the destination user interface displaying the information at the destination app, wherein the generated destination information is property-mapped differently for the registered destination app in at least one of the registrations that has the same topic-source app combination, wherein the intermediary processor is configured to facilitate mapping, at the intermediary processor, the information in the published message received from the source app according to the property mapping in the container storage and sending to the destination app a destination message with the information which has been property-mapped as destination information, and wherein the mapping includes omitting a portion of the information, recasting at least a portion of the information to a different data-type, extraction of at least a portion of the information, performing a calculation on the information, performing a string manipulation on the information, augmenting the information, so as to conform information that is not compatible as-is from the source app to the content fields displayed at the destination user interface which are to receive the information.

2. The intermediary computer system of claim 1, wherein receipt of the message at the intermediary processor and publication of the message from the intermediary processor is performed in accordance with OpenAjax Hub standards.

3. A visual wiring system comprising the intermediary computer system of claim 1 acting as a server, and a client computer system that is running the registered destination app as a client and further that is cooperatively connected to and in communication with the server, the intermediary processor being configured to coordinate receipt by the client of messages from the source app having information for the topic listing the registered destination app stored on the container storage.

4. A computer-implemented method, implemented on a computer system, for visual wiring of apps, comprising:
  providing, in a container storage, a plurality of registrations, each registration includes:
    (i) an indication of a topic among a plurality of topics,
    (ii) an indication of a source app, among a plurality of topics, that publishes, directly to subscribers, information, displayed on a source user interface of the source app, regarding the topic,
    (iii) an indication of a destination app registered at an intermediary processor for the topic to receive the information regarding the topic from the intermediary processor, and
    (iv) a property mapping indication of how fields in the information published by the source app map to fields in destination information displayed at a destination user interface of the destination app, wherein different registrations in the container storage for a same topic-source app combination support different property mappings for different destination apps;
  subscribing, by the intermediary processor, to the topic published by the source app;
  receiving, at the intermediary processor, a published message from the source app, the published message including the information sent from the source app and not property-mapped according to the property mapping in the container storage; and
  responsive to receipt of the published message from the source app:
    determining, at the intermediary processor, registrations in the container storage which indicate that there is a registered destination app which is registered for the topic in the published message from the source app, and then
      for each registration which indicates that there is a registered destination app registered for the topic in the published message for the source app,
        property-mapping the fields in the source information in the published message to the fields in the registered destination app according to the property mapping stored with the topic and the registered destination app in said registration in the container storage, to generate destination information, when it is determined that the registered destination app is registered for the topic in the published message, and then
        sending, from the intermediary processor, to the registered destination app which is determined to be registered for the topic, the generated destination information which has been property-mapped according to the property mapping in said registration in the container storage, when it is determined that the registered destination app is registered for the topic in the published message, so that publication caused by a change to the information at the source app triggers, via the intermediary processor, a reaction in the destination user interface displaying the information at the destination app, wherein the generated destination information is property-mapped differently for the registered destination app in at least one of the registrations that has the same topic-source app combination,
    the intermediary processor
      mapping the information in the published message received from the source app according to the property mapping in the container storage and sending to the destination app a destination message with the information which has been property-mapped as destination information,
      wherein the mapping includes omitting a portion of the information, recasting at least a portion of the information to a different data-type, extraction of at least a portion of the information, performing a calculation on the information, performing a string manipulation on the information, augmenting the information, so as to conform information that is not compatible as-is from the source app to the content fields displayed at the destination user interface which are to receive the information.

5. The method of claim 4, further comprising
  providing a source-destination-browser user interface that
    simultaneously displays on a single page at a client computer, the destination user interface of the destination app, the source user interface of the source app, and the topic published by the source app;
    interacts with a user, via a user input device interface, to selectively indicate on the source-destination-browser user interface (i) content fields displayed in the source user interface from which the information is to be sent and (ii) content fields displayed in the destination user interface which are to receive the information from the content fields in the source user interface; and storing, in the registration in the container storage, an indication of the destination app as being registered for the topic together with an indication of the selected content fields of the destination app which are to receive the information from the selected content fields of the source app, whereby the source app and the destination app do not need to be known to each other and are wired together at the registration in the container storage.

6. The method of claim 4, wherein receipt of the message at the intermediary processor and publication of the message from the intermediary processor is performed in accordance with OpenAjax Hub standards.

7. The method of claim 4, further comprising
providing a source-destination-browser user interface that simultaneously displays on a single page a plurality of topics published by the source app, each of the topics are published, each of the topics a source app, and interacts with a user to select at least one destination app to register for at least one of the plurality of topics.

8. The method of claim 4, further comprising
providing a source-destination-browser user interface that simultaneously displays on a single page a plurality of topics which are published each having a source app and at least one registered destination app, and interacts with a user to select one or more of the topics to be disabled from publishing.

9. A non-transitory computer-readable medium storing instructions for executing the method of claim 4.

10. A non-transitory computer-readable medium comprising instructions for execution by a computer, the instructions including a computer-implemented method for visual wiring of apps, the instructions for implementing:

providing, in a container storage, a plurality of registrations, each registration includes:
(i) an indication of a topic among a plurality of topics,
(ii) an indication of a source app, among a plurality of source apps, that publishes, directly to subscribers, information, displayed on a source user interface of the source app, regarding the topic,
(iii) an indication of a destination app registered at an intermediary processor for the topic to receive the information regarding the topic from the intermediary processor, and
(iv) a property mapping indication of how fields in the information published by the source app map to fields in destination information displayed at a destination user interface of the destination app,
wherein different registrations in the container storage for a same topic-source app combination support different property mappings for different destination apps;

subscribing, by the intermediary processor, to the topic published by the source app;

receiving, in response to the subscription, at the intermediary processor, a published message from the source app, the published message including the information sent from the source app and not property-mapped according to the property mapping in the container storage; and responsive to receipt of the published message from the source app:
determining, at the intermediary processor, registrations in the container storage which indicate that there is a registered destination app which is registered for the topic in the published message from the source app, and then for each registration which indicates that there is a registered destination app registered for the topic in the published message from the source app,
property-mapping the fields in the source information in the published message to the fields in the registered destination app according to the property mapping stored with the topic and the registered destination app in said registration in the container storage, to generate destination information, when it is determined that the registered destination app is registered for the topic in the published message, and then sending, from the intermediary processor, to the registered destination app which is determined to be registered for the topic, the generated destination information which has been property-mapped according to the property mapping in said registration in the container storage, when it is determined that the registered destination app is registered for the topic in the published message, so that publication caused by a change to the information at the source app triggers, via the intermediary processor, a reaction in the destination user interface displaying the information at the destination app, wherein the generated destination information is property-mapped differently for the registered destination app in at least one of the registrations that has the same topic-source app combination, and the intermediary processor
mapping the information in the published message received from the source app according to the property mapping in the container storage and
sending to the destination app a destination message with the information which has been property-mapped as destination information, wherein the mapping includes omitting a portion of the information, recasting at least a portion of the information to a different data-type, extraction of at least a portion of the information, performing a calculation on the information, performing a string manipulation on the information, augmenting the information, so as to conform information that is not compatible as-is from the source app to the content fields displayed at the destination user interface which are to receive the information.

11. The computer-readable medium of claim 10, further comprising instructions for:

providing a source-destination-browser user interface that simultaneously displays on a single page at a client computer, the destination user interface of the destination app, the source user interface of the source app, and the topic published by the source app;

interacts with a user, via a user input device interface, to selectively indicate on the source-destination-browser user interface (i) content fields displayed in the source user interface from which the information is to be sent and (ii) content fields displayed in the destination user interface which are to receive the information from the content fields in the source user interface; and storing, in the registration in the container storage, an indication of the destination app as being registered for the topic together with an indication of the selected content fields of the destination app which are to receive the information from the selected content fields of the source app, whereby the source app and the destination app do not need to be known to each other and are wired together at the registration in the container storage.

12. The computer-readable medium of claim 11, wherein receipt of the message at the intermediary processor and publication of the message from the intermediary processor is performed in accordance with OpenAjax Hub standards.

13. The computer-readable medium of claim 11, further comprising instructions for:
 providing the source-destination-browser user interface that
  simultaneously displays on a single page a plurality of topics published by the source app, each of the topics are published, each of the topics having a source app, and
  interacts with a user to select at least one destination app to register for at least one of the plurality of topics.

14. The computer-readable medium of claim 11, further comprising instructions for
 providing the source-destination-browser user interface that
  simultaneously displays on a single page a plurality of topics published by the source app, each of the topics are published, each of the topics having a source app and at least one registered destination app, and
 interacts with a user to select one or more of the topics to be disabled from publishing.

\* \* \* \* \*